United States Patent
Serebrin et al.

(10) Patent No.: US 8,612,975 B2
(45) Date of Patent: Dec. 17, 2013

(54) WORLD SWITCH BETWEEN VIRTUAL MACHINES WITH SELECTIVE STORAGE OF STATE INFORMATION

(75) Inventors: Benjamin C. Serebrin, Sunnyvale, CA (US); Michael Haertel, Portland, OR (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 959 days.

(21) Appl. No.: 12/498,784

(22) Filed: Jul. 7, 2009

(65) Prior Publication Data
US 2011/0010707 A1    Jan. 13, 2011

(51) Int. Cl.
*G06F 9/455* (2006.01)
(52) U.S. Cl.
USPC .................................. 718/1; 711/6; 711/162
(58) Field of Classification Search
USPC ..................... 718/1; 711/6, 162, E12.001
See application file for complete search history.

(56) References Cited

U.S. PATENT DOCUMENTS

| | | | |
|---|---|---|---|
| 7,415,708 B2 * | 8/2008 | Knauerhase et al. | 718/1 |
| 7,418,584 B1 * | 8/2008 | Klaiber et al. | 712/229 |
| 8,079,034 B2 * | 12/2011 | Bennett et al. | 718/104 |
| 8,099,574 B2 * | 1/2012 | Savagaonkar et al. | 711/163 |
| 2005/0132363 A1 * | 6/2005 | Tewari et al. | 718/1 |
| 2006/0015869 A1 * | 1/2006 | Neiger et al. | 718/1 |
| 2006/0294519 A1 * | 12/2006 | Hattori et al. | 718/1 |
| 2009/0007112 A1 * | 1/2009 | Moriki et al. | 718/1 |

* cited by examiner

*Primary Examiner* — Meng An
*Assistant Examiner* — Abu Ghaffari

(57) ABSTRACT

A data processing device includes one or more state registers to store state information associated with an execution core of the device. Each state register includes an associated "dirty" bit. When a guest program is executed at the execution core, a dirty bit is set in response to a change in the state information at the associated state register. In response to a world switch from the guest program to a VMM, the state information at each state register is stored to memory only if the associated dirty bit is set. In addition, if the VMM changes any stored state information, it clears a "clean" bit associated with the changed information. In response to a world switch from the VMM to a guest, the state information associated with cleared clean bits is retrieved from memory.

12 Claims, 5 Drawing Sheets

| TIME | EVENT | SEGREG1 341 | | VMCB 23 | |
|---|---|---|---|---|---|
| | | CONTENTS | DIRTY BIT 351 | STATE INFORMATION 461 | CLEAN BIT 471 |
| T1 | PRIOR TO VMRUN | UNKNOWN | UNKNOWN | UNKNOWN | UNKNOWN |
| T2 | DETERMINE VMRUN | UNKNOWN | UNKNOWN | UNKNOWN | UNKNOWN |
| T3 | LOAD DATA 1 TO SEGREG1 | DATA1 | SET | UNKNOWN | UNKNOWN |
| T4 | RECEIVE VMEXIT | DATA1 | SET | UNKNOWN | UNKNOWN |
| T5 | WRITE SEGMENT REGISTERS WITH SET DIRTY BITS TO VMCB 23 | DATA1 | SET | DATA1 | SET |
| T6 | WRITE DATA2 TO VMCB 23 AT STORE INFORMATION 461 | DATA1 | SET | DATA2 | CLEAR |
| T7 | DETERMINE VMRUN1 | DATA1 | SET | DATA2 | CLEAR |
| T8 | LOAD SEGMENT REGISTERS WITH INFORMATION ASSOCIATED WITH CLEAR CLEAN BITS | DATA2 | CLEAR | DATA2 | CLEAR |
| T9 | EXECUTE VM INSTRUCTIONS THAT DO NOT CHANGE SEGREG1 | DATA2 | CLEAR | DATA2 | CLEAR |
| T10 | DETECT VMEDIT | DATA2 | CLEAR | DATA2 | CLEAR |
| T11 | WRITE SEG REGISTERS WITH SET DIRTY BITS TO VMCB 23 | DATA2 | CLEAR | DATA2 | SET |

FIG. 5

WORLD SWITCH BETWEEN VIRTUAL MACHINES WITH SELECTIVE STORAGE OF STATE INFORMATION

BACKGROUND

1. Field of the Disclosure

The present disclosure relates to data processing devices and more particularly to virtual machines in data processing devices.

2. Description of the Related Art

Virtualization has been used in data processing devices for a variety of different purposes. Generally, virtualization of a data processing device may include providing one or more privileged programs with access to a virtual machine over which the privileged program has full control, but the control of the physical device is retained by a virtual machine manager (VMM). The privileged program, referred to herein as a guest, provides commands and other information targeted to hardware expected by the guest. The VMM intercepts the commands, and assigns hardware of the data processing device to execute each intercepted command. Virtualization may be implemented in software (e.g. the VMM mentioned above) without any specific hardware virtualization support in the physical machine on which the VMM and its virtual machines execute. In other embodiments, the hardware of the data processing device can provide support for virtualization.

Both the VMM and the guests are executed by one or more processors included in the physical data processing device. Accordingly, switching between execution of the VMM and the execution of guests occurs in the processors over time. For example, the VMM can schedule a guest for execution, and in response the hardware executes the guest VM. At various points in time, a switch from executing a guest to executing the VMM also occurs so that the VMM can retain control over the physical machine (e.g., when the guest attempts to access a peripheral device, when a new page of memory is to be allocated to the guest, when it is time for the VMM to schedule another guest, etc.). A switch between a guest and the VMM (in either direction) is referred to for purposes of discussion as a "world switch." Generally, the world switch involves saving processor state for the guest/VMM being switched away from, and restoring processor state for the guest/VMM being switched to.

BRIEF DESCRIPTION OF THE DRAWINGS

FIG. 5 is a diagram illustrating an example operation of the data processing device of FIG. 1 in accordance with one embodiment of the present disclosure.

DETAILED DESCRIPTION

A data processing device includes one or more state registers to store state information associated with an execution core of the device. Each state register is associated with a corresponding "dirty" bit. When a guest program is executed at the execution core, a dirty bit is set in response to a change in the state information at its associated state register. For example, the dirty bit can be set automatically by hardware of the data processing device in response to any operation, such as a write operation, that modifies the contents of its associated state register. In response to a world switch from the guest program to a VMM, the state information at each state register is stored to memory only if its associated dirty bit is set. Accordingly, only state information that has been changed by the guest is saved, reducing world switch time.

In addition, during its execution the VMM can employ a set of shadow registers to store state information, rather than using the registers employed by the guest. Thus, state information stored at the state registers by the guest is not altered by the VMM. Instead, the VMM can change stored state information at a control block associated with the guest. If the VMM changes any of a guest's stored state information, a "clean" bit associated with the changed state information is cleared. In response to a world switch from the VMM to a guest, the state information associated with cleared clean bits is retrieved from memory. Thus, state information that has not been changed by the VMM is not retrieved from memory, but instead is maintained in the state registers, reducing world switch time. Specific embodiment of the present disclosure will be better understood with reference to FIGS. 1-7.

Figure 1:
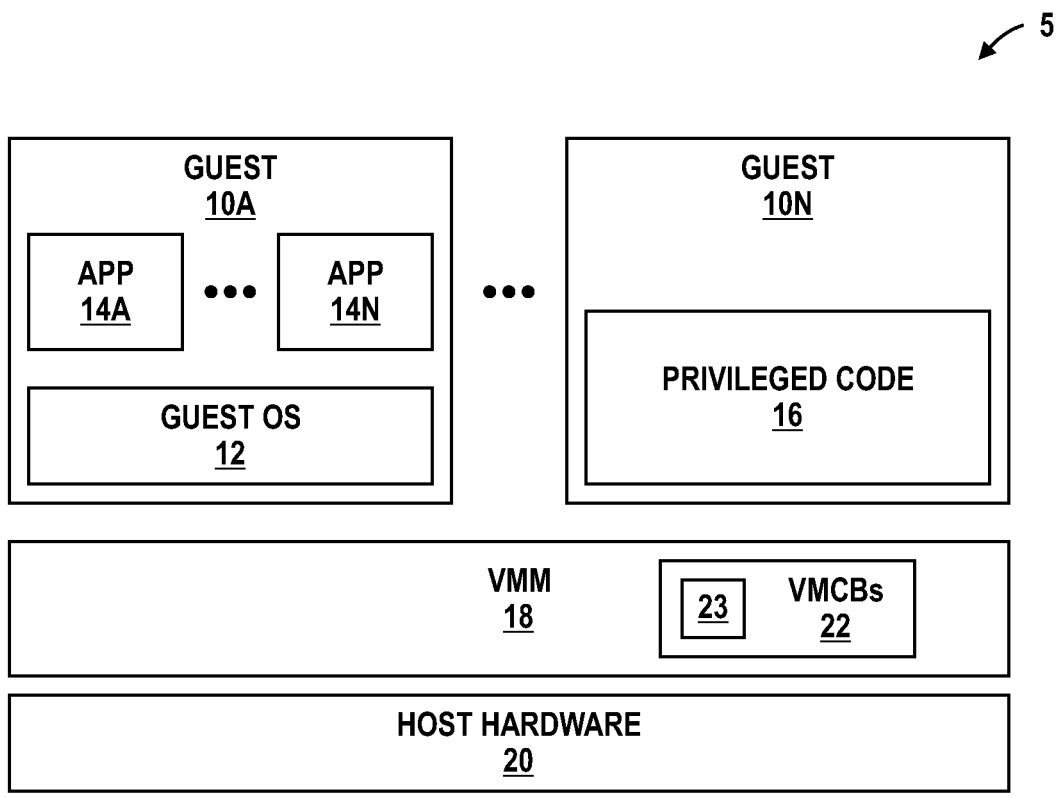
FIG. 1 is a block diagram of a data processing device in accordance with one embodiment of the present disclosure.

Turning now to FIG. 1, a diagram of a device 5 executing a VMM 18 and multiple guests 10A-10N in accordance with one embodiment of the present disclosure is illustrated. In the embodiment of FIG. 1, the device 5 includes host hardware 20 that can execute guest programs including guests 10A and additional guests through guest 10N. Guest 10A includes a guest operating system (OS) 12 and one or more applications 14A-14N. Guest 10N includes privileged code 16. The guests 10A-10N are managed by a virtual machine manager (VMM) 18 that is also executed by the host hardware 20. In one embodiment, the VMM 18 may maintain a set of virtual machine control blocks (VMCBs) 22. There may be one VMCB 22 for each guest 10A-10N. Thus, for example, one VMCB can be associated with guest 10A while a different VMCB is associated with guest 10N. While the VMCBs 22 are shown as part of the VMM 18 for purposes of illustration in FIG. 1, the VMCBs 22 may be stored in memory and/or on non-volatile media such as disk drives in the host hardware 20.

The host hardware 20 generally includes all of the hardware associated with operation of VMM 18, guest 10A and guest 10B, such as an integrated circuit that includes a data processing device. In various embodiments, the host hardware 20 may include a data processing device having one or more processor cores, memory devices, peripheral devices, and other devices used to couple the preceding components. For example, the host hardware 20 can include a Northbridge device that provides an interface between data processing devices, memory, and a graphics device that uses the advanced graphic port (AGP) interface. Additionally, the Northbridge device can provide an interface to a peripheral bus such as the peripheral component interface (PCI) bus. The host hardware 20 can also include a Southbridge device, to provide legacy functionality and/or provide an interface to legacy hardware. In other embodiments, the host hardware 20 can include HyperTransport (HT) links to link nodes, each of which may include one or more processors, a host bridge, and a memory controller. The host bridge may be used to provide an interface, via HT links, between peripheral devices.

In some embodiments, the host hardware 20 may include hardware support for virtualization. The VMM 18 may be configured to provide the virtualization for each of the guests 10A-10N, and may control the access of the guests 10A-10N to the host hardware 20. The VMM 18 may also be responsible for scheduling the guests 10A-10N for execution on the host hardware 20. The VMM 18 and guests 10A-10N may be configured to use the hardware support provided in the host hardware 20 for virtualization. In some embodiments, the VMM 18 may be implemented as a "thin" standalone software program that executes on the host hardware 20 and provides the virtualization for the guests 10A-10N. Such a VMM implementation may sometimes be referred to as a "hypervisor."

In other embodiments, the VMM 18 may be integrated into or execute on a host OS. In such embodiments, the VMM 18 may rely on the host OS, including any drivers in the host OS, platform system management mode (SMM) code provided by the system BIOS, etc. In such an environment, the host OS components (and various lower-level components such as the platform SMM code) execute directly on the host hardware 20 and are not virtualized by the VMM 18. The VMM 18 and the host OS (if included) may together be referred to as the "host", in one embodiment.

The VMM 18 may maintain a virtual machine control block (VMCB) for each guest 10A-10N. For example, in the illustrated embodiment of FIG. 1, the VMM 18 maintains a VMCB 23 for the guest 10A. The VMCB 23 may generally comprise a data structure stored in a storage area that is allocated by the VMM 18 for the corresponding guest 10A. In one embodiment, the VMCB 23 may comprise a page of memory, although other embodiments may use larger or smaller memory areas and/or may use storage on other media such as non-volatile storage. In one embodiment, the VMCB 23 may include the guest's processor state, which can be stored to the VMCB 23 from a processor of host hardware 20 when the guest exits and which can be loaded into the processor in the host hardware 20 when the guest is scheduled to execute.

An instruction that transfers control from the VMM to a guest is referred to herein as a "Virtual Machine Run (VM-RUN)" instruction. In some embodiments, only a portion of the processor state stored at the VMCB 23 is loaded in response to the VMRUN instruction, and other desired state may be loaded by the VMM 18 prior to executing the VMRUN instruction. Similarly, in such embodiments, only a portion of the processor state may be stored to the VMCB 23 by the processor on guest exit and the VMM 18 may be responsible for storing any additional state as needed. In other embodiments, the VMCB 23 may include a pointer to another memory area where the processor state is stored. Furthermore, in one embodiment, two or more exit mechanisms may be defined. In one embodiment, the amount of state stored and the location of state that is loaded may vary depending on which exit mechanism is selected. Thus, for example, an instruction "VMRUN1" can result in first amount of state being loaded from a first memory location while a different instruction "VMRUN2" can result in a different amount of state being loaded from a second instruction.

In one embodiment, the VMM 18 may also have a portion of memory (termed, for purposes of discussion, the "VMM state portion") allocated to store the processor state corresponding to the VMM 18. When the VMRUN is executed, the processor state corresponding to the VMM 18 may be saved in the VMM state portion.

Additionally, the VMCB 23 may include an intercept configuration that identifies intercept events that are enabled for the guest, and the mechanism for exiting the guest if an enabled intercept event is detected. In one embodiment, the intercept configuration may include a set of intercept indications, one indication for each intercept event that the processor supports. The intercept indication may indicate whether or not the processor is to intercept the corresponding event (i.e., whether or not the intercept is enabled). As used herein, an event is "intercepted" in a guest if, should the event occur in the guest, the processor exits the guest for processing of the event. In one embodiment, the intercept configuration may include a second set of indications that indicate which of two exit mechanisms are used. Other embodiments may define more than two exit mechanisms. In another embodiment, the intercept configuration may comprise one set of intercept indications, one per intercept event, that indicate whether or not a first exit mechanism should be used for the event; and a second set of intercept indications, one per intercept event, that indicate whether or not a second exit mechanism should be used for the event.

Generally, the exit mechanism may define the hardware and software operations performed by the processor to exit guest execution (generally in a restartable fashion) and to begin executing other code. Additionally, relatively simple intercept processing may be processed through a "lighter weight" exit mechanism which may take less time to perform, which may improve performance in some embodiments. More complicated processing may be performed in the VMM, after a "heavier weight" mechanism is used to exit. Thus, in this embodiment, the VMM 18 may configure the processor to intercept those events that the VMM 18 does not wish the guest 10A-10N to handle internally, and may also configure the processor for which exit mechanism to use. Events may include instructions (that is, intercept an instruction instead of executing it), interrupts, exceptions, and/or any other desired events that may occur during guest execution.

In one embodiment, the VMCB 23 may further include other control bits that may cause the processor to perform certain actions upon loading the VMCB 22. For example, the control bits may include indications to flush the translation look aside buffer (TLB) in the processor. Other control bits may specify the execution environment for the guest (e.g. interrupt handling modes, an address space identifier for the guest, etc.). Still other control bits may be used to communicate an exit code describing why the guest exited, etc.

Generally, a "guest" may comprise any one or more software programs that are to be virtualized for execution in the data processing device. A guest may include at least some code that executes in privileged mode, and thus expects to have full control over the data processing device on which it is executing. Guest 10A is an example in which the guest includes a guest OS. The guest OS may be any OS, such as any of the Windows OS available from Microsoft Corp., (Redmond, Wash.), any UNIX-type operating system such as Linux, AIX from IBM Corporation (Armonk, N.Y.), Solaris from Sun Microsystems, Inc. (Santa Clara, Calif.), HP-UX from Hewlett-Packard Company (Palo Alto, Calif.), etc. The guest 10N is an example of a guest that comprises non-OS privileged code 16.

Figure 2:
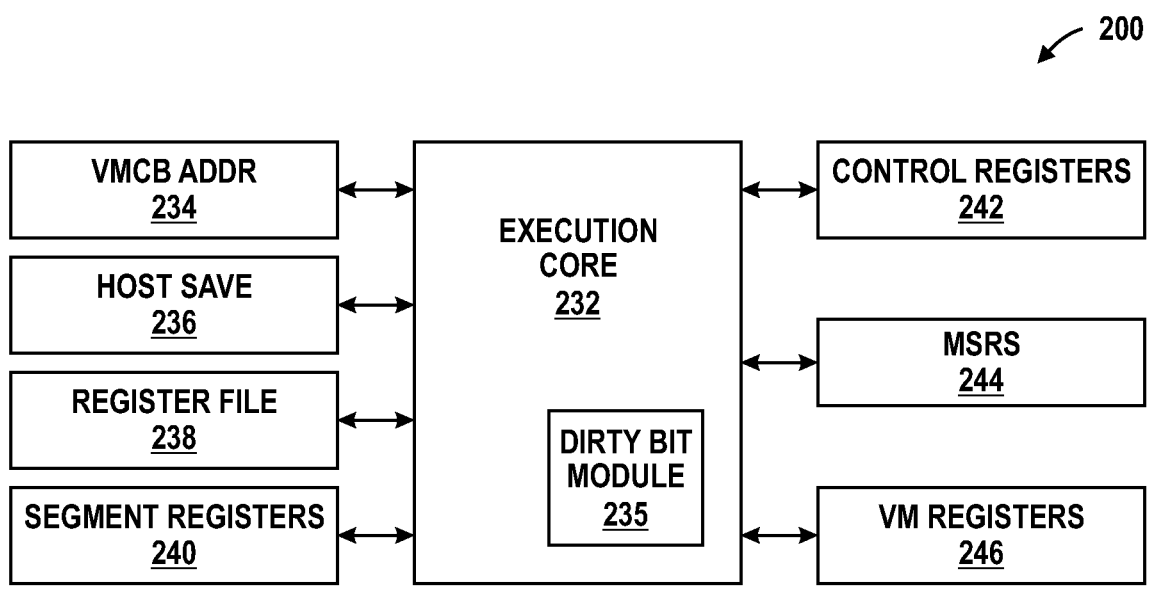
FIG. 2 is a block diagram of a particular embodiment of the host hardware of FIG. 1.

FIG. 2 is a block diagram illustrating one embodiment of a processor device 200 included in the host hardware 20 of FIG. 1. In the illustrated embodiment, the processor device 200 includes an execution core 232, a VMCB address register 234, a host save register 236, a register file 238, a set of segment registers 240, a set of control registers 242, a set of model specific registers (MSRs) 244, and a set of virtual machine (VM) registers 246. The execution core 232 is connected to each of the registers 234, 236, 238, 240, 242, 244, and 246.

The execution core 232 is configured to execute the instructions defined in the instruction set architecture implemented by the processor device 200 (e.g. the x86 instruction set architecture, including AMD64™ extensions). The execution core 232 may be a superpipelined core, a superscalar core, or a combination thereof in various embodiments. Alternatively, the execution core 232 may be a scalar core, a pipelined core, a non-pipelined core, and the like. The execution core 232 may employ out of order speculative execution or in order execution in various embodiments. The execution core 232 may include microcoding for one or more instructions or other functions, in combination with any of the above constructions.

The execution core 232 includes a dirty bit module 235. The dirty bit module 235 includes control logic, e.g., hardware or firmware, to set dirty bits associated with the segment registers 240 in response to the segment information in the segment registers is changed. In particular, in response to information being modified at a segment register by a guest, the dirty bit module 235 can automatically set a corresponding dirty bit. Further, in response to the execution core 232 determining a VMEXIT event, the dirty bit module 235 can review each dirty bit and, for each dirty bit that is set, facilitate storage of the modified segment information at its associated segment register to the VMCB 23. Thus, only segment information that has been modified by the guest is stored to the VMCB 23, thereby reducing the amount of information written to the VMCB on a world switch from the guest to the VMM 18.

The VMM 18 is configured to set clean bits associated with segment registers when corresponding information is stored at VMCB 23, and to clear clean bits associated with segment registers represented at the VMCB 23 when the segment information is changed by the VMM 18. In particular, in response to a segment state information being changed, the VMM 18 can automatically clear an associated clean bit. In addition, in response to a VMRUN instruction, the VMM 18 can review each clean bit and, for each clean bit that is cleared, load the associated segment information into a corresponding one of the segment registers 240. Thus, only segment state information that has been changed by the VMM 18 is loaded into the segment registers 240 in response to a world switch from the VMM 18 to the guest, thereby reducing world switch time.

It will be appreciated that, although for purposes of discussion the dirty bit module 235 is illustrated and discussed as being implemented in hardware, in other embodiments the functions of the modules can be performed by software executing at the execution core 232. It will further be appreciated that, although for purposes of discussion the setting and clearing of clean bits, as well as the retrieval of information based on the status of clean bits, is illustrated and discussed as being implemented by the VMM 18, in other embodiments these functions can be performed by a dedicated hardware module.

The register file 238 may comprise various registers defined for use with the instructions that the execution core 232 is configured to execute. For example, the register file 238 may comprise integer registers, floating point registers, multimedia registers, etc.

The control registers 242 may comprise a variety of control registers that control the general operating mode of the processor device 200. The control registers, for example, may include various control bits that control protected mode, whether or not paging is enabled, various paging/protected mode options, interrupt enable indications and handling, base addresses of various tables used by the processor such as the segment descriptor tables, the page tables, and the like. The configuration of the control registers 242 can be based on the instruction set architecture of the processor device 200. For example, if the processor device 200 implements the x86 instruction set architecture (including AMD64™ extensions), the control registers 242 may include CR0, CR3, CR4 (not shown) the local descriptor table register (LDTR), the global descriptor table register (GDTR), the interrupt descriptor table register (IDTR), the extended feature enable register (EFER), the debug registers, the task register (TR), the system call registers (STAR, LSTAR, CSTAR, SFMASK, 20 etc.), and the like.

The MSRs 244 may comprise one or more registers that are implementation dependent. That is, the instruction set architecture may permit a given implementation to define any set of MSRs 244 that may be desirable for that implementation.

The VM registers 246 comprise one or more registers that are included in the processor device 200 to provide virtual machine support (that is, to support virtualization for the guests 10A-10N of FIG. 1). The VMCB address register 234 and the host save register 236 may be considered to be VM registers 246, but have been shown separately in FIG. 3 for purposes of illustration. For example, the VM registers 246 may include registers that may be loaded with virtual interrupt state to permit an interrupt to be injected into a guest.

The segment registers 240 may be provided in accordance with the x86 instruction set architecture. More particularly, the segment registers 240 may be part of the privilege protection mechanism employed by the processor device 200 when the processor is in protected mode. In protected mode, each segment register 40 may be loaded with a segment selector using a segment load instruction. The segment selector identifies a segment descriptor in a segment descriptor table in memory that sets the privilege level for the segment and also includes other protection control bits and other information. When a segment selector is loaded into a segment register, the execution core 232 loads the segment descriptor from the segment descriptor table and loads the descriptor information, or information derived from the segment descriptor, into a hidden portion of the segment register.

Figure 3:
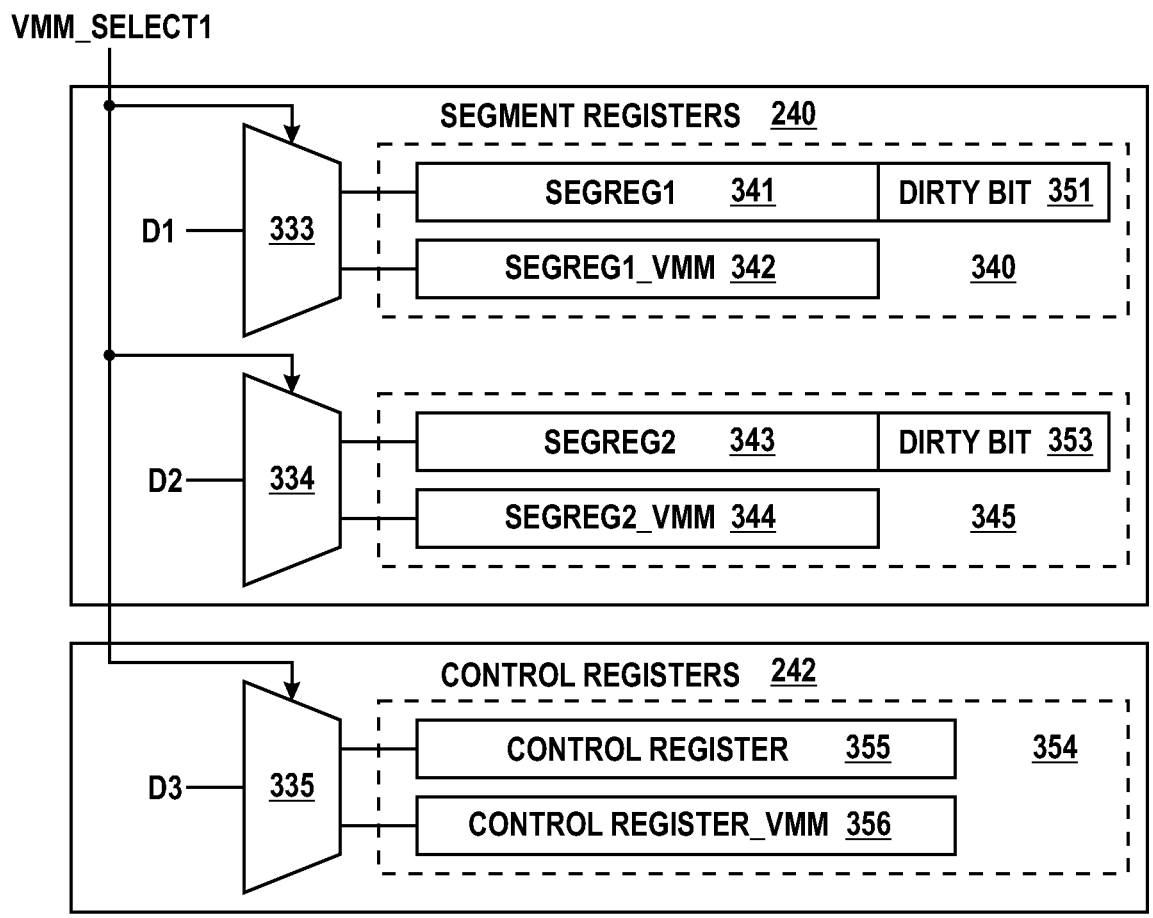
FIG. 3 is a block diagram of a particular embodiment of registers of FIG. 2.

A particular embodiment of the segment registers 240 and the control registers is illustrated at FIG. 3. In the illustrated embodiment, the segment registers 240 include one or more shadow registers that can be selected as the primary register set by a multiplexer. For example, FIG. 3 illustrates a segment location 340 that includes a segment register 341, a dirty bit 351, and a segment register 342, and a segment location 345 that includes a segment register 343, a dirty bit 353, and a segment register 344. The segment registers 240 also includes switch modules 333 and 334. The switch module 333 includes an input/output port connected to a bus labeled "D1", a control input to receive a signal labeled "VMM_SELECT1", an output connected to the segment register 341, and an output connected to the register 342. The switch module 334 includes an input/output port connected to a bus labeled "D2", a control input to receive the signal VMM_SELECT1, an input/output port connected to the segment register 343, and an input/output port connected to the register 344

In operation, the switch modules 333 and 334 are used to select one of the segment registers of a segment location for access, thereby allowing segment information to be stored and retrieved from one of segment register 341 and register 342, and from one of segment register 343 and register 344, respectively. In particular, based upon the signal VMM_SELECT1, the switching module 333 connects one of the registers 341 and 342 to the bus D1 to allow retrieval and storage of information at the associated register. Similarly, based upon the signal VMM_SELECT1, the switching module 334 connects one of the registers 343 and 344 to the bus D1 to allow retrieval and storage of information at the associated register.

In an embodiment, the state of the VMM_SELECT1 signal is based upon whether a guest or the VMM 18 is being executed at the execution core 232. For example, when a guest is being executed, the VMM_SELECT signal can be set so that segment information (labeled "SEGREG1" and "SEGREG2", respectively) is stored and retrieved from segment registers 341 and 343. When the VMM 18 is being executed, the VMM_SELECT signal can be set so that segment information is stored and retrieved from registers 342 and 344. This allows segment information for the guest to be maintained in the segment registers 240 after a world switch, improving the speed of the world switch.

The dirty bits 351 and 353 indicate whether a guest has modified information stored in the associated segment register since a VMRUN instruction returned control to the guest. In particular, in response to determining that information has been written to a segment register by a guest, the execution core 232 sets a dirty bit that is associated with the modified segment register. In response to a VMEXIT instruction, the execution core 232 can read and store information to the VMCB 23 from only those segment registers that have been modified, as indicated by a set dirty bit. For example, if at the time of a VMEXIT command, dirty bit 351 has been set, the execution core writes the information SEGREG1 to the VMCB 23 for the associated guest. However, the execution core 232 does not write the information stored in segment register 343 if dirty bit 353 has not been set. Thus, only that segment information which has been modified by the guest, and, therefore, not already represented in VMCB 23, is written to memory. This improves the speed with which a world switch can take place. In an embodiment, the dirty bits 351 and 353, and the writing of segment information to the VMCB 23, are controlled by the hardware of the dirty bit module 235 (FIG. 2). Thus, software executing at the execution core 232 does not have to perform these functions, improving the speed of a world switch.

As shown in the illustrated embodiment, segment registers 342 and 344 do not have an associated dirty bit. In contrast to the segment registers 341 and 343, which may be accessed by different guests, the information in the registers 342 and 344 is controlled by the VMM 18 and is not accessible by the guests. Accordingly, the segment information in these registers may not be cached or otherwise stored to memory in response to a world switch.

FIG. 3 also illustrates a particular embodiment of the control registers 242. In particular, FIG. 3 illustrates a control location 354, including a control register 355 and 356. The control registers 355 also includes a switch module 335 having an input/output port connected to a bus labeled "D3", a control input to receive the signal VMM_SELECT1, an output connected to the register 355, and an output connected to the register 356.

In operation, the switch module 335 selects one of the control registers 355 and 356 based on the signal VMM_SELECT. Accordingly, when the VMM 18 is being executed at that execution core 232, control information is stored at and retrieved from control register 356. When a guest is being executed at the execution core 232, control information is stored and retrieved at control register 355. The control register 355 does not include an associated dirty bit. Accordingly, in response to a VMEXIT instruction, the dirty bit module 235 always writes the information stored at control register 355 to the VMCB associated with the exiting guest. Thus, dirty bits may be omitted for designated state registers so that associated state information is always stored to a VMCB. This can be useful for registers that store information which is frequently changed, or for registers that can be quickly copied to the VMCB in response to the VMEXIT.

Figure 4:
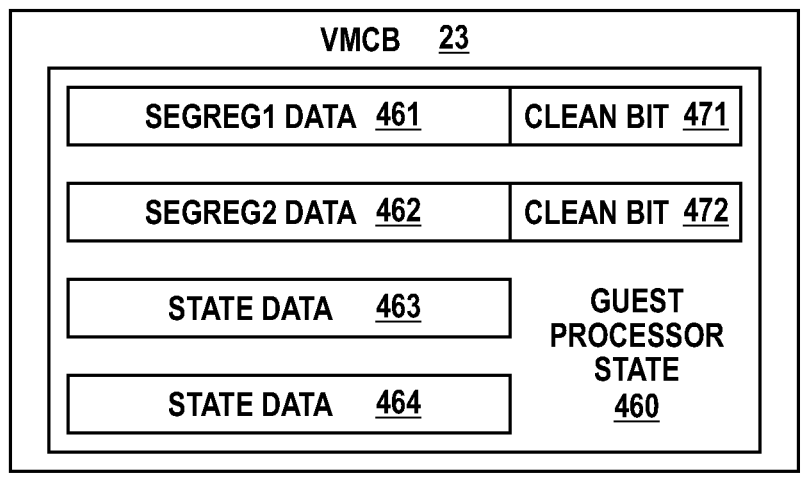
FIG. 4 is a block diagram of a particular embodiment of a virtual machine control block of FIG. 1.

FIG. 4 illustrates a block diagram of a VMCB 23 in accordance with one embodiment of the present disclosure. In the illustrated embodiment, the VMCB 23 stores guest processor state information 460 for an associated guest, including segment state information 461, labeled "SEGREG1 DATA", segment state information 462, labeled "SEGREG2 DATA", and other state information 463. Segment state information 462 is associated with a clean bit 471, while segment state information 463 is associated with a clean bit 472.

In operation, in response to a VMEXIT instruction, the dirty bit module 235 causes each modified segment register of the segment registers 240, as indicated by a set dirty bit, to be stored at VMCB 23. In addition, the VMM 18 ensures that the modified segment registers are stored along with a set clean bit that indicates the data stored at VMCB is the same as the data that was written from the segment register. Therefore, the clean bits 471 and 472 are set by the VMM 18 in response to a VMEXIT event.

Following completion of the VMEXIT event, the second set of segment registers associated with the execution core 232 is selected, thereby passing control of the execution core 232 to VMM 18. If the VMM 18 modifies information stored at a VMCB 23 it will be necessary to update this information in the actual register set. In particular, in response to segment state information being modified at the VMCB 23 by the VMM 18, VMM 18 automatically clears the associated clean bit. In response to a VMRUN instruction, the execution core 232 checks each clean bit, and retrieves only that segment state information for which the clean bit is in a cleared state. Thus, only segment state information that was modified by the VMM 18 is retrieved and loaded into segment registers 240 (FIG. 2). This reduces the amount of segment state information that is loaded in response to each VMRUN instruction, reducing world switch time. It will be appreciated that if another guest, associated with a different VMCB, is executed by the VMM 18, VMM 18 can clear all of clean bits at the VMCB 23 can be cleared, so that all of the state information at VMCB 23 is loaded the next time the associated guest is executed.

This can be better understood with reference to an example. For purposes of discussion, assume that GUEST 10A is being executed. In response to a VMEXIT, the dirty bit module 235 copies information from the segment registers 240 that has set dirty bits to the VMCB 23. The VMM 18 sets all the clean bits for segment information stored at the VMCB 23. The VMM executes in response to the VMEXIT, and then executes a VMRUN for a different guest, GUEST 10N. In response, the VMM 18 clears all the clean bits at the VMCB 23. Accordingly, the next time the GUEST 10A is executed, all of the segment information at VMCB 23 will be loaded into the segment registers 240, ensuring that those registers include the cached segment state for GUEST 10A. In a particular embodiment, the segment information for each guest 10A-10N can be stored and retrieved according to the example described above. Accordingly, in response to a VMRUN instruction, the VMM 18 can determine whether segment information for the guest associated with the VMRUN is stored at the segment registers 240. If not, the segment information is retrieved from the VMCB associated with the guest that will be executed by the VMRUN.

In a particular embodiment, the other state information 463 and 464 does not include associated clean bits. Accordingly, the other state information 463 and 464 is loaded into associated state registers in response to each VMRUN instruction. Further, the VMM 18 can be configured so that it loads associated state information in response to not locating a set clean bit. This provides for compatibility with VMCBs and associated hardware that do not support clean bits, as the VMM 18 will load any state information for which no clean bit is found.

The operation of the data processor device 200 can be better understood with reference to FIG. 5, which illustrates an example operation of the device with respect to the contents of segment register 341 for a specific VM. In particular, column 501 indicates a time, column 502 indicates a particular event or condition at the execution core 232, column 503 indicates the contents of the segment register 341, column 504 indicates the contents of the dirty flag 351 in response to the associated event. Column 505 indicates the segment information stored at segment state information 461 in response to the associated event while column 506 indicates the state of clean flag 471 in response to the associated event.

In the illustrated example, at time T1, the execution core 232 is in a condition prior to executing a VMRUN. For example, the execution core 232 may be in a startup condition, or executing the VMM 18. At this time, the contents of the segment register 341, the dirty bit 351, the state information 461, and the clean bit 471 are all in an unknown state. At time T2, the execution core 232 determines a VMRUN instruction. For purposes of discussion, it is assumed that the VMRUN instruction requests execution of GUEST 10A, associated with VMCB 23. Accordingly, in response to the VMRUN instruction, the execution core 232 executes GUEST 10A. At time T3, during execution of GUEST 10A, the execution core loads a data value, labeled "DATA1", into the segment register 341. In response, the dirty bit module 235 sets the dirty bit 504 as illustrated at column 504. At time T4, a VMEXIT event is determined at the execution core 232. In response, at time T5 the dirty bit module 235 examines the dirty bit 351 and in response to determining the bit is set, stores the information DATA1 at the VMCB 23, as illustrated in column 504. The VMM 18 also sets clean bit 471 as indicated at column 505.

In response to the VMEXIT instruction determined at time T4, the VMM 18 is executed at the execution core 232. At time T6, during execution of the VMM 18, the VMM writes a data value, labeled DATA2, to the state information 461. In response, the VMM 18 clears the clean bit 471, as indicated at column 506. At time T7, the execution core 232 determines a VMRUN instruction to indicate a world switch from the VMM 18 to GUEST 10A is occurring. In response, at time T8 the VMM 18 determines the clean bit 471 is in a set state, and loads the segment data DATA2 into the segment register 341, as illustrated at column 503. Further, the dirty bit module 235 clears the dirty bit 504, to indicate the segment information at the segment register 341 matches the segment information 461 at the VMCB 23.

At time T9, during execution of GUEST 10A, the execution core executes instructions. In the illustrated example, these instructions do not result in any changes to the data stored at the segment register 341. Accordingly, the dirty bit module 235 does not set the dirty bit 351. At time T1, the execution core 232 determines a VMEXIT event, indicating a world switch from GUEST 10A. In response, at time T11, the dirty bit module 235 causes information from the segment registers 240 that have set dirty bits to be stored at the VMCB 23. Because the dirty bit 351 is not set, the dirty bit module 235 does not cause the information at segment register 341 to be stored. This reduces the amount of time needed to store segment state information, reducing world switch time.

Figure 6:
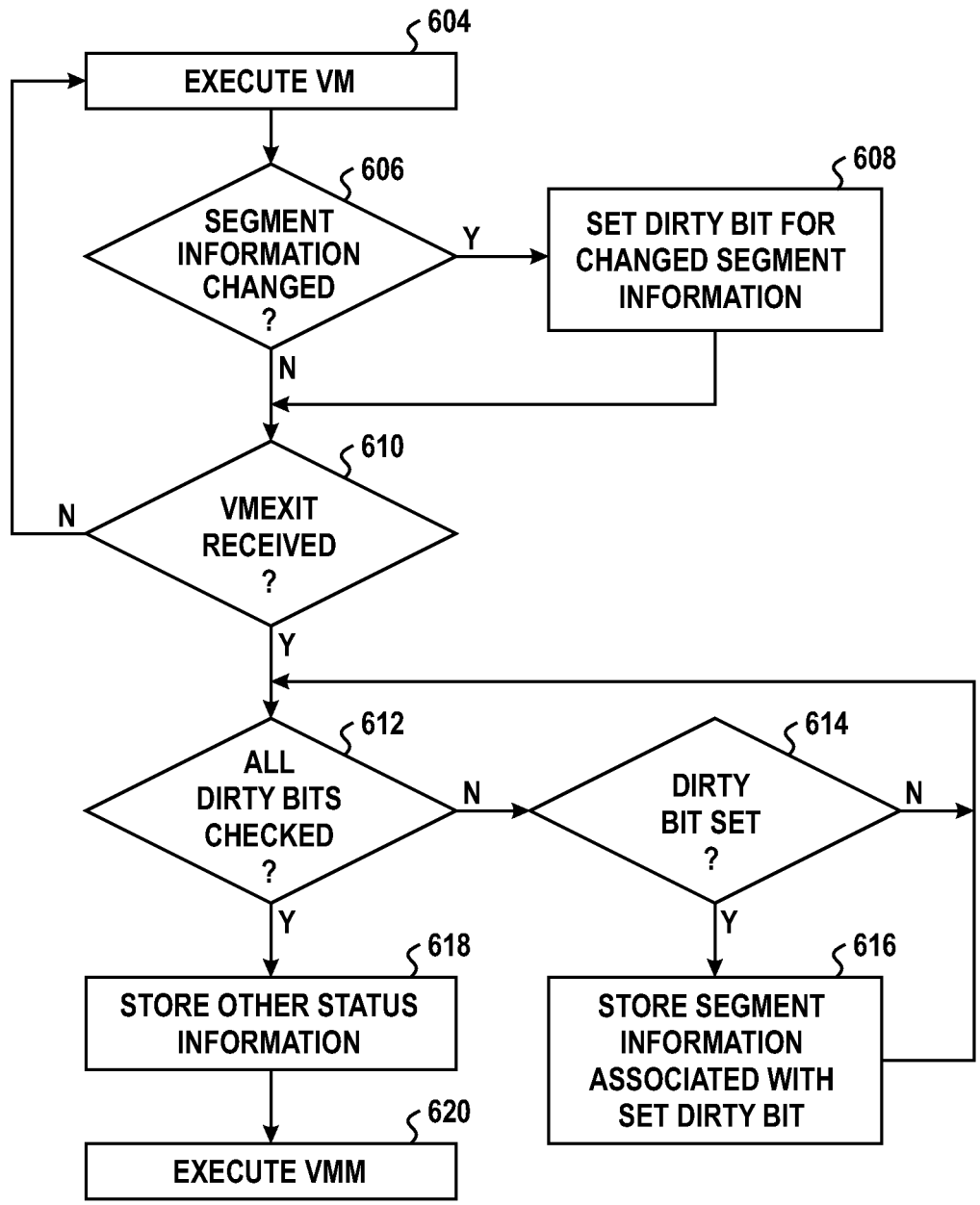
FIG. 6 is a flow diagram of a method of switching from a guest to a VMM in accordance with one embodiment of the present disclosure.

FIG. 6 illustrates a flow diagram of a method of world switching in accordance with one embodiment of the present disclosure. At block 604, the execution core 232 executes a guest. At block 606, while the guest is being executed, the execution core 232 determines whether an instruction results in a change to segment information stored at segment register 341. If not, the method flow proceeds to block 606. If the segment information has changed, the method flow moves to block 608, and the dirty bit 351 is set.

At block 610, the execution core 232 determines if a VMEXIT event has occurred. If not, the method flow returns to block 604 and the execution core 232 continues to execute the guest. In response to receiving a VMEXIT event, the method flow moves to block 610 and the execution core determines if all dirty bits have been checked. If not, at block 614 the execution core 232 checks a dirty bit. If the dirty bit is not set, the method flow returns to block 610. In response to determining the dirty bit is set, at block 616 the execution core 232 stores the segment information stored at the segment register 341 to the VMCB 23.

Returning to block 612, in response to determining all dirty bits have been checked the method flow proceeds to block 618 and the execution core 232 stores other state information for the execution core 232 to the VMCB 23. The method proceeds to block 620 and the execution core 232 executes the VMM 18.

Figure 7:
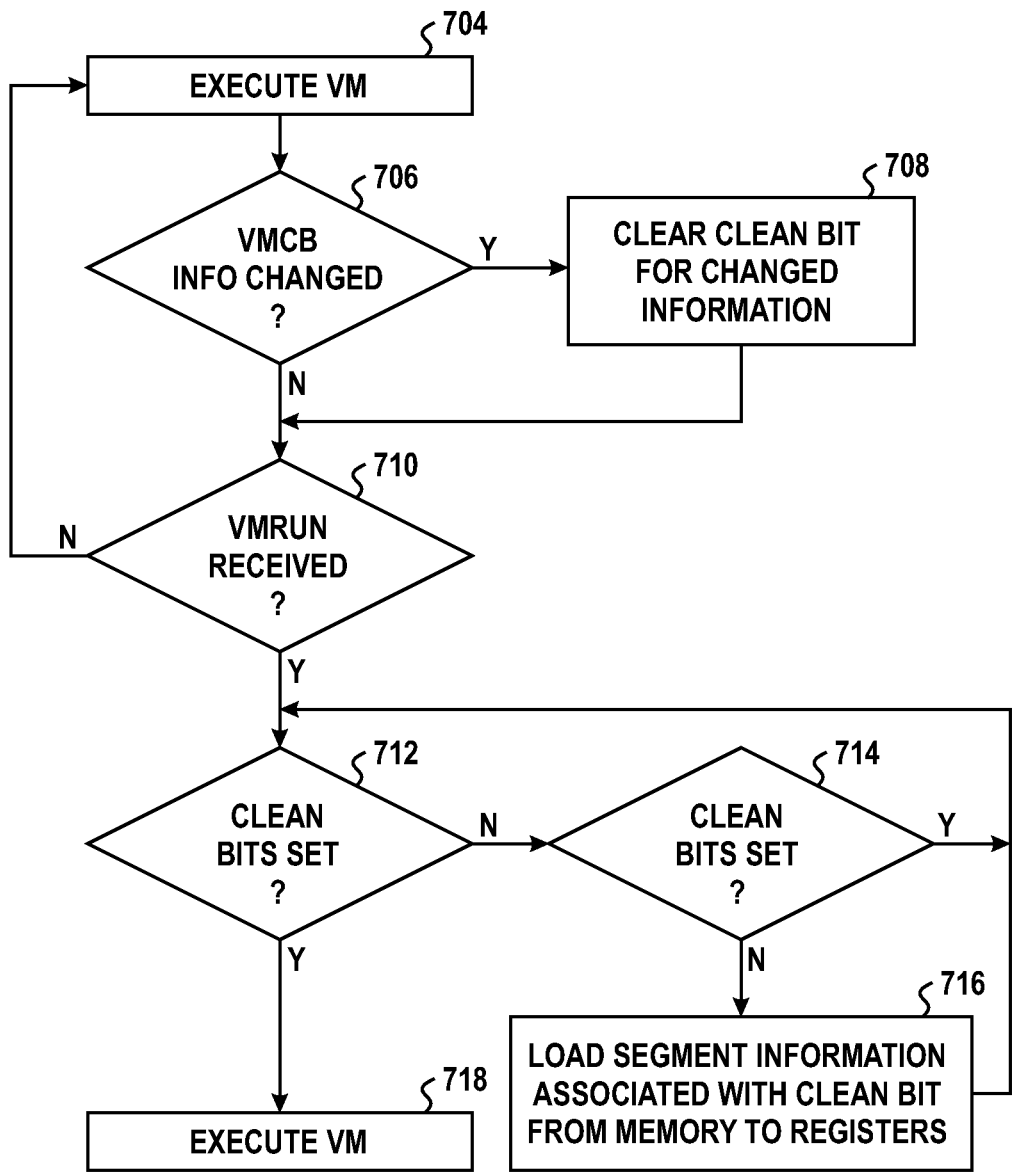
FIG. 7 is a flow diagram of a method of switching from a VMM to a guest in accordance with one embodiment of the present disclosure.

FIG. 7 illustrates a flow diagram of a method of world switching in accordance with another embodiment of the present disclosure. At block 704, the execution core 232 executes instructions of the VMM 18. In response to each instruction, at block 706, the execution core 232 determines if the instructions has resulted in modification to the segment information stored at VMCB 23. If the segment information has not been modified, the method flow proceeds to block 710. If the segment information has been modified, the execution core sets the clean bit associated with the modified segment information, at block 708. The method flow proceeds to block 710.

At block 710, the execution core 232 determines if a VMRUN instruction has been received. If not, the method flow returns to block 704 and the execution core 232 continues to execute instructions of the VMM. In response to receiving a VMRUN instruction, the method flow moves to block 712 and the execution core 232 determines if it has checked all clean bits associated with state information at the VMCB 23. If so, the method flow proceeds to block 718 and the guest indicated by the VMRUN instruction is executed.

If, at block 712, the execution core 232 determines that at least one clean bit has not been checked, the method flow moves to block 714 and the execution core 232 determines whether the a clean bit is in the set state. If so, the method returns to block 712. If the clean bit is in the clear state, the method flow moves to block 716 and the execution core retrieves the segment information associated with the clear clean bit and loads it into the associated segment register. The method flow returns to block 712.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. For example, it is noted that the letter "N" when used herein in reference numerals such as 10N is meant to generically indicate any number of elements bearing that reference 30 numeral (e.g. any number of guests 10A-10N, including one guest). Additionally, different reference numerals that use the letter "N" (e.g. 10N and 14N) do not necessarily indicate like numbers of the different elements are provided (e.g. the number of guests 10A-10N may differ from the number of applications 14A-14N). Further, the term register refers to any storage location implemented in the processor that is addressable (or otherwise accessible) using an instruction. Registers may be implemented in various fashions. For example, registers may be implemented as any sort of clocked storage devices such as flops, latches, etc. Registers may also be implemented as memory arrays, where a register address may be used to select an entry in the array. The register file 238 may be implemented in such a fashion, in some embodiments. Any combination of implementations may be used in various embodiments of the processor device 200. The various registers 34, 36, 38, 40, 42, 44, and 46 may comprise processor state in one embodiment. Any other registers may be implemented in other embodiments that may be part of the processor state, as desired.

What is claimed is:

1. A method comprising:
   enabling access to a plurality of state registers during execution of a guest virtual machine at a data processing device, the plurality of state registers storing state information for the guest virtual machine;
   responsive to a world switch from execution of the guest virtual machine to execution of a virtual machine manager, preventing virtual machine manager access to the plurality of state registers, and enabling virtual machine manager access to a control block during execution of a virtual machine manager at the data processing device, and storing to the control block only that state information of the plurality of state registers identified as modified during execution of the guest virtual machine, the control block comprising at least one of a plurality of shadow registers corresponding to the plurality of state registers, and a block of a memory coupled to the data processing device; and
   responsive to a world switch from execution of the virtual machine manager to execution of the guest virtual machine, loading to the plurality of state registers only that state information of the control block identified as modified during execution of the virtual machine manager.

2. The method of claim 1, wherein the control block further includes intercept configuration information identifying one or more intercept events that are enabled during execution of the guest virtual machine.

3. A method comprising
   operating a data processing device comprising a plurality of state registers, wherein each state register is associated with a corresponding dirty bit of a plurality of dirty bits and with a corresponding segment of a control block, and wherein each segment of the control block is associated with a corresponding clean bit of a plurality of clean bits;
   during execution of a guest virtual machine at the data processing device, asserting the dirty bit associated with a state register responsive to the data processing device modifying state information stored at the state register;
   responsive to a first world switch from the execution of the guest virtual machine to execution of a virtual machine manager at the data processing device, storing to the corresponding segments of the control block only that state information stored at state registers having asserted dirty bits, the control block comprising at least one of a plurality of shadow registers corresponding to the plurality of state registers, and a block of a memory coupled to the data processing device;
   during execution of the virtual machine manager following the first world switch:
      preventing the virtual machine manager from modifying the state information stored at the plurality of state registers, and
      clearing the clean bit associated with a segment in response to the data processing device modifying state information stored at the segment; and
   responsive to a second world switch from the execution of the virtual machine manager back to execution of the guest virtual machine, loading to corresponding state registers only those modified values stored at segments of the control block having cleared clean bits.

4. The method of claim 3, further comprising:
   asserting the clean bit associated with a segment responsive to storing state information to the segment.

5. The method of claim 3, wherein each state register includes the corresponding dirty bit.

6. The method of claim 3, wherein the control block further includes intercept configuration information identifying one or more intercept events that are enabled during execution of the guest virtual machine.

7. A data processing device comprising:
   a plurality of state registers, each state register associated with a corresponding dirty bit of a plurality of dirty bits and with a corresponding segment of a plurality of segments of a control block, each segment associated with a corresponding clean bit of a plurality of clean bits;
   an execution core to enable access to the plurality of state registers during execution of a guest virtual machine and to prevent access to the plurality of state registers by a virtual machine manager and to enable access to the control block during execution of the virtual machine manager;
   wherein the execution core further is to assert the dirty bit associated with a state register responsive to modification of state information stored at the state register during execution of the guest virtual machine and to clear the clean bit associated with a segment responsive to modification of state information stored at the segment during execution of the virtual machine manager;
   wherein the execution core further is to store to the corresponding segments of the control block only that state information stored at state registers having asserted dirty bits in response to a world switch from execution of the guest virtual machine to execution of a virtual machine manager, the control block comprising at least one of a plurality of shadow registers corresponding to the plurality of state registers, and a block of memory coupled to the data processing device, and a block of a memory coupled to the data processing device; and
   wherein the execution core further is to load to corresponding state registers only those modified values stored at segments of the control block having cleared clean bits in response to a world switch from execution of the virtual machine manager to execution of the guest virtual machine.

8. The data processing device of claim 7, wherein the data processing device is to assert the clean bit associated with a segment responsive to storing state information to the segment.

9. The data processing device of claim 7, wherein each state register includes the corresponding dirty bit.

10. The data processing device of claim 7, wherein the control block further includes intercept configuration information identifying one or more intercept events that are enabled during execution of the guest virtual machine.

11. A data processing device comprising:
a plurality of state registers to store state information for a guest virtual machine; and
an execution block to enable access to the plurality of state registers during execution of the guest virtual machine and to prevent access to the plurality of state registers and enable access to a control block during execution of a virtual machine manager, wherein the control block comprises at least one of: a plurality of shadow registers corresponding to the plurality of state registers, and a block of a memory coupled to the data processing device;
wherein the execution block further is to store to the control block only that state information of the plurality of state registers identified as modified during execution of the guest virtual machine responsive to a world switch from the execution of the guest virtual machine to execution of the virtual machine manager; and
wherein the execution block further is to load to the plurality of state registers only that state information of the control block identified as modified during execution of the virtual machine manager responsive to a world switch from the execution of the virtual machine manager to execution of the guest virtual machine.

12. The data processing device of claim 11, wherein the control block further includes intercept configuration information identifying one or more intercept events that are enabled during execution of the guest virtual machine.

* * * * *